US009545814B2

(12) United States Patent
Shimada (10) Patent No.: US 9,545,814 B2
(45) Date of Patent: Jan. 17, 2017

(54) DECORATED PARTS WITH DESIGN CONTAINING COAT LAYER

(71) Applicant: TRINITY INDUSTRIAL CORPORATION, Aichi (JP)

(72) Inventor: Tokinobu Shimada, Aichi (JP)

(73) Assignee: TRINITY INDUSTRIAL CORPORATION, Aichi (JP)

( * ) Notice: Subject to any disclaimer, the term of this patent is extended or adjusted under 35 U.S.C. 154(b) by 0 days.

(21) Appl. No.: 14/429,008

(22) PCT Filed: Jan. 23, 2014

(86) PCT No.: PCT/JP2014/051335
§ 371 (c)(1),
(2) Date: Mar. 18, 2015

(87) PCT Pub. No.: WO2014/156252
PCT Pub. Date: Oct. 2, 2014

(65) Prior Publication Data
US 2016/0001587 A1    Jan. 7, 2016

(30) Foreign Application Priority Data

Mar. 29, 2013 (JP) .................................. 2013-072779
Dec. 19, 2013 (JP) .................................. 2013-262147

(51) Int. Cl.
*B44C 1/00* (2006.01)
*B23K 26/06* (2014.01)
(Continued)

(52) U.S. Cl.
CPC ........... *B44C 1/005* (2013.01); *B23K 26/0006* (2013.01); *B23K 26/0054* (2013.01);
(Continued)

(58) Field of Classification Search
CPC ............ B44C 1/00; B32B 3/00; B23K 26/342
See application file for complete search history.

(56) References Cited

U.S. PATENT DOCUMENTS

| 5,630,877 A | 5/1997 | Kashiwagi et al. |
| 2003/0012935 A1* | 1/2003 | Kuntz ................... B42D 25/00 428/209 |
| 2007/0095466 A1* | 5/2007 | Tsuda ..................... H05K 3/108 156/272.2 |

FOREIGN PATENT DOCUMENTS

| JP | 63-175670 | 7/1988 |
| JP | 3-73367 | 3/1991 |

(Continued)

*Primary Examiner* — Betelhem Shewareged
(74) *Attorney, Agent, or Firm* — Clark & Brody (57) ABSTRACT

A method for decorating a given part is designed to print designs onto a coat layer deteriorating the coat layer on the surface of the given part. In the coat layer-forming process, in spreading the metallic-coating material containing aluminum flake onto the surface of the resin compact, the coat layer is formed on the surface of it. In a laser-printing process, a laser is irradiated on the condition of being able to maintain the same state of the coat layer before and after irradiating the laser, so as to reduce the aspect ratio of the micronized-metallic powder, which is the average value of the ratio of the maximum dimension of the micronized-metallic powder to the average value of the minimum dimension of the micronized-metallic powder, which laser irradiation eventually thermally deforms the first scale-shaped micronized-metallic powder into a spherical shape in the coat layer to print designs on the film.

8 Claims, 5 Drawing Sheets

(51) Int. Cl.
    *B23K 26/08*    (2014.01)
    *B23K 26/00*    (2014.01)

(52) U.S. Cl.
    CPC ...... *B23K 26/0643* (2013.01); *B23K 26/0648*
        (2013.01); *B23K 26/0861* (2013.01); ***B23K
        26/342* (2015.10); *B44C 1/00* (2013.01); *B23K
        2201/007* (2013.01); *B23K 2203/10*** (2013.01);
                                        *B23K 2203/42* (2015.10)

(56) References Cited

FOREIGN PATENT DOCUMENTS

| | | | | |
|---|---|---|---|---|
| JP | 3-151083 | 6/1991 | | |
| JP | 8-114893 | 5/1996 | | |
| JP | 2002-273832 | 9/2002 | | |
| JP | 2003-024868 | 1/2003 | | |
| JP | 2003024868 A * | 1/2003 | ............... | B05D 3/06 |
| JP | 2004-209458 | 7/2004 | | |
| JP | 2009-125673 | 6/2009 | | |
| JP | 2011-506124 | 3/2011 | | |
| JP | 2012-520905 | 9/2012 | | |

* cited by examiner

DECORATED PARTS WITH DESIGN CONTAINING COAT LAYER

TECHNICAL FIELD

This invention relates to methods for decorating parts and to such decorated parts in which a layer is formed on the surface of a part, and designs are printed on that surface by irradiating laser.

TECHNICAL BACKGROUND

To improve the design or quality of automotive decoration or the like, many different decorated parts for a vehicle (i.e. console box, instrument panel, arm-rest or the like) are practically used, and such decoration is added to the surface of a resin compact. As a method for enhancing the decoration of decorated parts, the hydraulic-transfer method is generally used. The hydraulic-transfer method is a technique in which a special film with some predetermined design (i.e. a wood-grain pattern, a geometric pattern or the like) is floated on the water surface to transfer the designs to the surface of the resin compact by water pressure. This technique makes it possible to print the designs three-dimensionally onto the surface of the part.

As a decorative method other than the hydraulic-transfer method, the laser-printing method is known. Laser printing is a decorative method in which a laser is irradiated onto the surface of a part. The surface of the part then changes (i.e. curved, burned or the like) by the heat of the laser so as to print the designs on the surface. As such, this decorative method makes it possible to print the designs at a low cost compared to the hydraulic-transfer method.

Patent Document 1 or the like shows a technology for providing the printing of characters onto the surface of a part by irradiating laser onto that surface. This technology involves an aluminum metallic powder being mixed with a coating material that is then coated onto the surface of the part. Then, in heating the metallic powder efficiently by laser-irradiation, the coating material is burned and removed.

PRIOR ART DOCUMENT

Patent Document

Patent Document 1: Unexamined patent application, No. 2003-24868

Problems to Be Resolved by This Invention

As shown in Patent Document 1, if a laser is irradiated onto the surface of a coat layer for providing laser processing to curve the surface of the coat layer into a hollow shape, the aluminum metallic powder is exposed on the processing section of the surface of the coat layer. In this case, the performance of chemical resistance and oil-staining resistance or the like deteriorates, thus not securing sufficient product liability.

This invention was achieved in light of the foregoing problems in providing a decorative method for parts to avoid deterioration of the performance of the coat layer on the surface of parts and to print designs on the surface of the parts. Another objective was in providing for decorated parts of excellent product liability that will maintain the performance of the coat layer on the surface of the parts.

Means for Solving the Problems

To solve the aforementioned problems, the first aspect of this invention refers to a decorative method in which a coat layer is formed on the surface of a given part, and a laser is irradiated onto the surface of that part to print designs on it, and is characterized in comprising a coat layer-forming process to form the coat layer by using a coating material containing the first scale-shaped micronized-metallic powder and comprising a laser-printing process in which a laser is irradiated on the condition of being able to maintain the same state of the surface of the coat layer before and after irradiating the laser, so as to reduce the aspect ratio of the micronized-metallic powder, which is the average value of the ratio of the maximum dimension of the micronized-metallic powder to the average value of the minimum dimension of the micronized-metallic powder, which laser irradiation eventually thermally deforms the first micronized-metallic powder in the coat layer to print the designs on the film. The second aspect of this invention refers to a decorative method in which a coat layer is formed on the surface of a given part, and a laser is irradiated onto the surface of the coat layer to print designs on the surface, and is characterized in comprising a coat layer-forming process to form the coat layer by using a coating material containing the first scale-shaped micronized-metallic powder and comprising a laser-printing process in which a laser is irradiated on the condition of being able to maintain the same state of the surface structure and color of the coat layer before and after irradiating the laser, so as to reduce the aspect ratio of the coat layer, which is the average value of the maximum dimension of the micronized-metallic powder to the average value of the minimum dimension of the micronized-metallic powder, which laser irradiation eventually thermally deforms the first scale-shaped micronized-metallic powder of the coat layer into the second spherical-shaped micronized-metallic powder to print the designs on the film.

The first and second aspects of this invention allow for the formation of a coat layer on the surface of a part in the coat layer-forming process by using a coating material including the first scale-shaped micronized-metallic powder. In the laser-printing process, a laser is irradiated on the condition of being able to maintain the same state of the coat layer before and after irradiating the laser. At this time, the aspect ratio that is the average value-ratio of the maximum dimension (i.e. the average value of the major axis) of the micronized-metallic powder to the average value of the minimum dimension (i.e. the average value of the thickness) of the micronized-metallic powder is reduced, so as thermally to deform the first micronized-metallic powder eventually in the coat layer to print the designs on it. Specifically, once the laser is irradiated onto the processing area (the laser-irradiation area), the first micronized-metallic powder is thermally deformed in shape and scale into a near spherical shape, thus decreasing its surface area. On the other hand, in the non-laser irradiation area, the first micronized-metallic powder of a larger aspect ratio stays un-deformed, which can make a difference in the optical transmittance and optical reflectivity of the coat layer between the laser-irradiation area and the non-laser irradiation area, thus making it possible to print the designs. Also, the convex and concave parts are not made on the surface of the coat layer before and after laser irradiation. Yet, the same surface state can be maintained. Such a decorative method allows for printing the designs without curving the surface of the coat layer that is applied as the conventional technique, thus being able to avoid the problem of the micronized-metallic powder being exposed on the surface of the coat layer. As such, it is possible to maintain the coat layer performance (i.e. resistance to chemicals, to oils, to contamination or the like) on the surface of the parts, thus sufficiently being able to secure part-product liability.

The coat layer might include a colored pigment except for a black pigment or a color-dye compound except for a black-dye compound. In this case, in the laser-irradiation area, the first micronized-metallic powder is thermally deformed, thus reducing its surface area. Then, the pigment or dye compound hidden behind the first micronized-metallic powder will be seen at the surface part of the parts, in which case the color of the pigment or dye compound is accentuated, thereby making it possible to print the designs clearly onto the coat layer, thus sufficiently improving the design quality of the parts.

The average value of the maximum dimension of the first scale-shaped micronized-metallic powder is 5 to 50 μm. Preferably, the average value of the minimum dimension should be 0.05 to 2 μm. In forming the coat layer by using a coating material containing such a micronized-metallic powder, it is surely possible to obtain the metallic appearance on the surface of the parts.

The aspect ratio of the first scale-shaped micronized-metallic powder is 20 or more. In the laser-printing process, it is preferable to deform thermally the first micronized-metallic powder until the aspect ratio is less than 5. Also, it is preferable to deform thermally the micronized-metallic powder until it becomes nearly spherical in shape (with an aspect ratio of about 1). As such, it is surely possible to print the designs on the coat layer of the parts, thus improving the design quality of the parts.

The first scale-shaped micronized-metallic powder is a micronized powder in which colored pigment is absorbed therein and may function as a colored metallic-powder pigment. This makes it possible to print the designs on the surface of the coat layer of the parts, thus sufficiently improving design quality.

The ingredients forming the micronized-metallic powder include metallic ingredients such as aluminum, iron, gold, silver, copper, nickel, tin and stainless steel or the like. The coating material forming the coat layer includes a metallic-coating material (i.e. the coating material in which the micronized-metallic powder is contained in a semi-transparent enamel such as a thermosetting-acrylic coating material).

It is preferable in forming the coat layer to use a non-leafing type of metallic-coating material of which the first scale-shaped micronized-metallic powder will not appear at the surface part of the coat layer, and the laser-absorption rate of the coat layer will be 40 percent or less, preferably 10 percent or less. As such, the first micronized-metallic powder will not exist at the surface part of the coat layer, and the energy of the laser is hardly absorbed at the surface part of the coat layer, thus surely preventing the convex and concave parts from forming on the surface of the coat layer in the laser-printing process. Also, in the case that a non-leafing type of metallic-coating agent is used, the first scale-shaped micronized-metallic powder is uniformly spread and aligned parallel to the surface of the coat layer. Thus, in the laser-printing process, the laser irradiating off the surface part of the coat layer surely hits the first micronized-metallic powder in the coat layer. Therefore, such processing heat can thermally deform the micronized-metallic powder.

Specifically, the micronized-metallic powder preferably should be of aluminum flakes and of a ratio of 0.5 to 5.0% by weight of the coat layer. If the aluminum flakes in the coat layer is less than 0.5% by weight, it is likely that the decoration by aluminum-flake thermal-deformation will not be sufficiently obtained. In the case that the aluminum flakes of the coat layer exceeds 5.0% in weight, the aluminum flakes are greatly affected so that the coloring effect by the pigment will not be sufficiently obtained. Therefore, as described in this invention, the micronized-metallic powder of aluminum flakes of a ratio of 0.5 to 5.0% by weight makes it possible to print the designs onto the coat layer of the surface of the parts.

The pigment preferably should be of a ratio of 1.0 to 8.5% by weight of the coat layer, which makes it possible to print the designs onto the coat layer of a part surface.

As the condition for laser irradiation, the laser wavelength preferably should be 1,064 nm, and the laser-energy density should be 50 to 900 MW/cm$^2$, resulting in the laser energy being absorbed by the aluminum flakes, thus making it possible to deform the aluminum flakes thermally.

The third aspect of this invention refers to a decorated part of which a coat layer is formed on the part surface, and designs are printed on the coat layer, and is characterized in comprising a first region mainly of the first scale-shaped micronized-metallic powder of an aspect ratio that is the average value of the ratio of the maximum dimension of the micronized-metallic powder to the average value of the minimum dimension of the micronized-metallic powder, and comprising a second region mainly of a second micronized-metallic powder that is of an aspect ratio less than that of the first value. Upon the coat layer, the designs are printed according to the alignment and shape of the first and second regions.

The fourth aspect of this invention refers to a decorated part of which a coat layer is formed on the part surface, and designs are printed on the coat layer, and is characterized in comprising a first region mainly of a scale-shaped first-micronized metallic powder of an aspect ratio that is the average value of the ratio of the maximum dimension of the micronized-metallic powder to the average value of the minimum dimension of the micronized-metallic powder, and comprising a second region mainly of a second spherical-shaped micronized metallic powder of an aspect ratio less than that of the first value, and the surface structure and color are the same as those of the first region. Upon the coat layer, the designs are printed according to the alignment and shape of the first and second regions.

The third and fourth aspects of this invention allow the coat layer formed on the surface of a decorated part to have the first region that mainly contains the first scale-shaped micronized-metallic powder of the aspect ratio of the first value and to have the second region that mainly contains the second micronized-metallic powder of which the aspect ratio is the second value, which is less than that of the first value. In other words, the aspect ratio of the first micronized-metallic powder contained in the first region is greater than that of the second micronized-metallic powder and is scale-shaped with a large surface area. On the other hand, the aspect ratio of the second micronized-metallic powder contained in the second region is less than that of the first micronized-metallic powder, and its shape is close to a spherical shape with a smaller surface area, which makes it possible to differentiate the optical transmittance and optical reflectivity of the coat layers in the first and second regions, thus making it possible to print the designs according to the alignments and shapes of each region. Also, the designs can be printed on the decorative surface of this invention without curving the coat layer, as does the conventional art. Thus, the surface condition of the first region is almost the same as that of the second region. In other words, the decorated parts of this invention make it possible to avoid the problem of the micronized-metallic powder not being exposed on the coat layer. Therefore, it is possible to maintain the performance of the coat layer (the performance of chemical resistance or of oil-staining resistance or the like), thus securing sufficient product liability of the decorated parts.

The coat layer formed on the surface of the decorated parts preferably should contain a pigment other than a black pigment. Compared to the first scale-shaped micronized-metallic powder contained in the first region, the aspect ratio of the second micronized-metallic powder contained in the second region is less, and its surface area is smaller, thus being able to accentuate the color of the pigment in the second region, which makes it possible to print clear designs on the coat layer, thus sufficiently improving the design quality of the parts.

Effect of the Invention

As described above, the first to third aspects of this invention prevent deterioration of the performance of the coat layer on the surface of the parts and provide the decorative method for printing designs on the parts. Also, the fourth or fifth aspect of this invention makes it possible to maintain the performance of the coat layer on the surface of the parts, thus providing decorated parts with excellent product liability.

MODES FOR CARRYING OUT THE INVENTION

Figure 1:
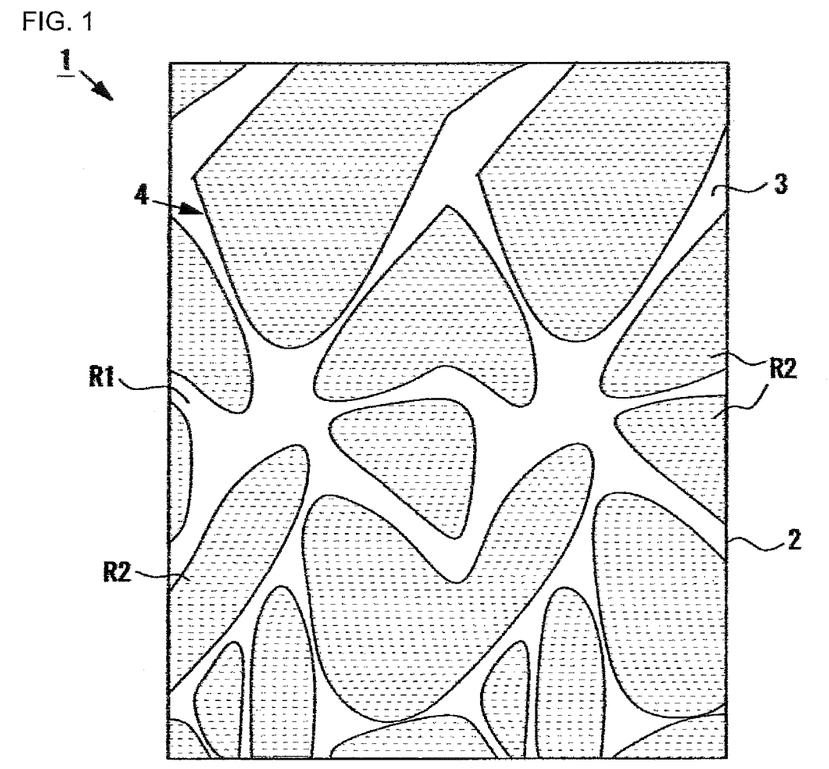
FIG. 1 is a plane view showing the partial surface of an automotive-decorated part of the embodiment.
Figure 2:
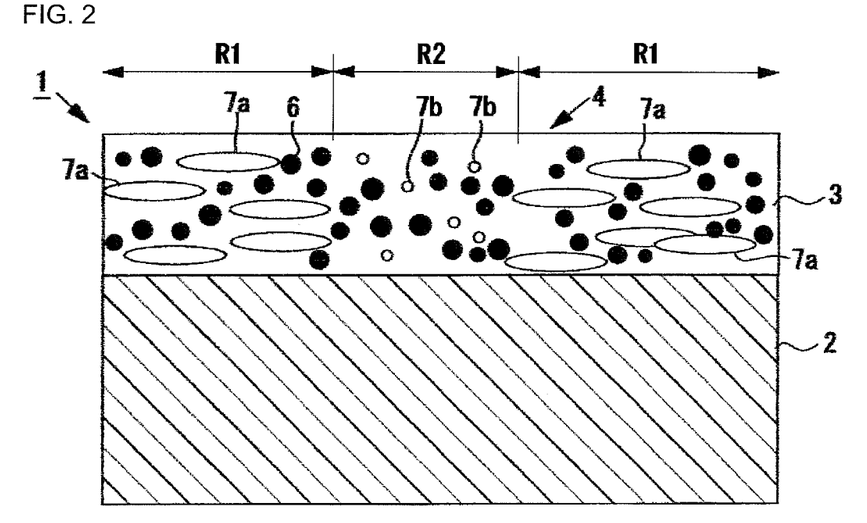
FIG. 2 is an enlarged cross-sectional view showing an automotive-decorated part.

Hereinafter, the first embodiment of this invention is described in reference to the drawings. FIG. 1 is a plane view showing the partial surface of an automotive decorated part 1 of the embodiment. FIG. 2 is an enlarged cross-sectional view showing an automotive decorated part 1.

As shown in FIGS. 1 and 2, the automotive decorated part 1 comprises a three-dimensional resin compact 2, a coat layer 3 formed to cover the surface of the resin compact 2, and a coat layer having a predetermined form of the design 4. The design 4 of the embodiment of this invention is made of multiple designs surrounded by curved lines of different shapes and sizes. The automotive decorated part 1 is a decorative panel to cover the upper surface of an armrest to be provided on an automobile door. Also, the resin compact 2 is a resin product formed using a colored thermoplastic resin (i.e. a flesh-colored ABS resin).

The coat layer 3 is formed for example containing a blue-colored pigment 6 and a micronized-metallic powder. The micronized-metallic powder is a metallic powder of aluminum (aluminum powder). The thickness of the coat layer 3 is set for example at 5 to 35 μm (to 15 μm as the embodiment of this invention). The coating material used for this coat layer 3 is a metallic-coating material containing the aluminum flake 7a (scale-shaped micronized-metallic powder) that has no optical transmittance against the water-clear-colored two-pack acrylic-urethane resin-coating material. Also, in the embodiment of this invention, the non-leafing type of metallic-coating material in which the aluminum flake 7a does not appear at the surface part of the coat layer is used.

Also, the metallic-coating material contains the aluminum flake 7a of the ratio of 0.5 to 5.0% by weight and the pigment 6 of the ratio of 1.0 to 8.5% by weight. The aluminum flake 7a is formed by the spreading of a thin layer of aluminum powder with a roller or the like. The average value of the maximum particle-diameter (longest diameter) of the aluminum flake 7a is for example 5 to 50 μm (around 15 μm for the embodiment of this invention), and the average thickness of the aluminum flake 7a is for example 0.05 to 2 μm (around 0.3 μm for the embodiment of this invention). Also, the size of the pigment 6 is one-tenth or less of the particle size of the aluminum flake 7a, with the average particle diameter often being from a few hundred nm to a few μm (micrometers).

The coat layer 3 comprises the first region R1 mainly of the scale-shaped aluminum flake 7a (first micronized-metallic powder) and the second region R2 mainly of the spherical-shaped aluminum powder 7b (second micronized-metallic powder). In the embodiment of this invention, the aluminum flake 7a contained in the first region R1 has the aspect ratio of A1 (=D1/T1) of the micronized-metallic powder, which is the average value (average value of the longest diameter D1 in FIG. 3) of the ratio of the maximum dimension of the micronized-metallic powder to the average value (the average value of the thickness T1 in FIG. 3) of the minimum dimension of the micronized-metallic powder and is 20 or more (of the first value). Also, the spherical-shaped aluminum powder contained in the second region R2 has the aspect ratio of A2 (=D2/T2), which is the average ratio of the longest diameter D2 to the average value of the thickness T2 and is 3 or less (of the second value). Thus, the aspect ratio is less than the aluminum flake 7a.

Figure 3:
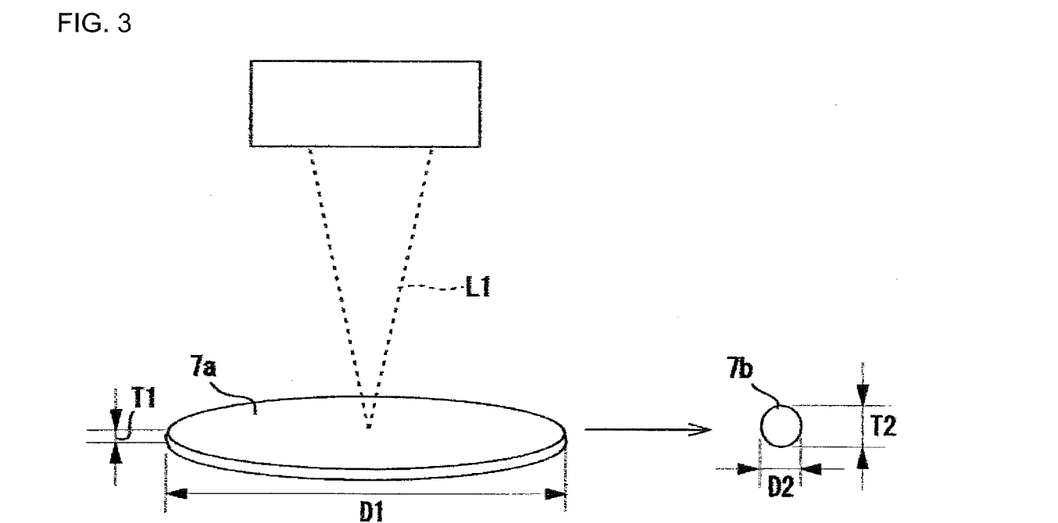
FIG. 3 is an explanatory diagram showing the heat deformation of aluminum flakes by the laser-processing heat.

As shown in FIG. 3, the spherical-shaped aluminum powder 7b is formed by the processing heat of the laser L1 that thermally deforms (condenses) the aluminum flake 7a. The surface area of the aluminum powder 7b is less than that of the aluminum flake 7a. In other words, regarding the coat layer 3 in FIGS. 1 and 2, the second region R2, mainly of the spherical-shaped aluminum powder 7b, is the laser-irradiation area that is formed by laser irradiation that thermally deforms the scale-shaped aluminum flake 7a into a spherical shape. On the other hand, the first region R1 is the non-laser irradiation area where the aluminum flake 7a stays un-deformed.

As such, the surface area of the micronized metallic powder (aluminum flake 7a, aluminum powder 7b) contained in the coat layer 3 is different between the first region R1 and the second region R2, thus making it possible to differentiate the optical reflectivity and optical transmittance. Therefore, the design 4 is printed according to the alignment and shape of each region R1 or R2 regarding the difference in optical reflectivity and optical transmittance.

In the embodiment of this invention, the aluminum flake 7a and aluminum powder 7b do not exist nor are exposed at the surface of the coat layer 3. Also, regarding the coat layer 3, the surface condition of the first region R1 is the same as that of the second region R2. In other words, the convex and concave parts corresponding to the design 4 are not formed on the coat layer 3, and the surface of the coat layer 3 is flat.

Figure 4:
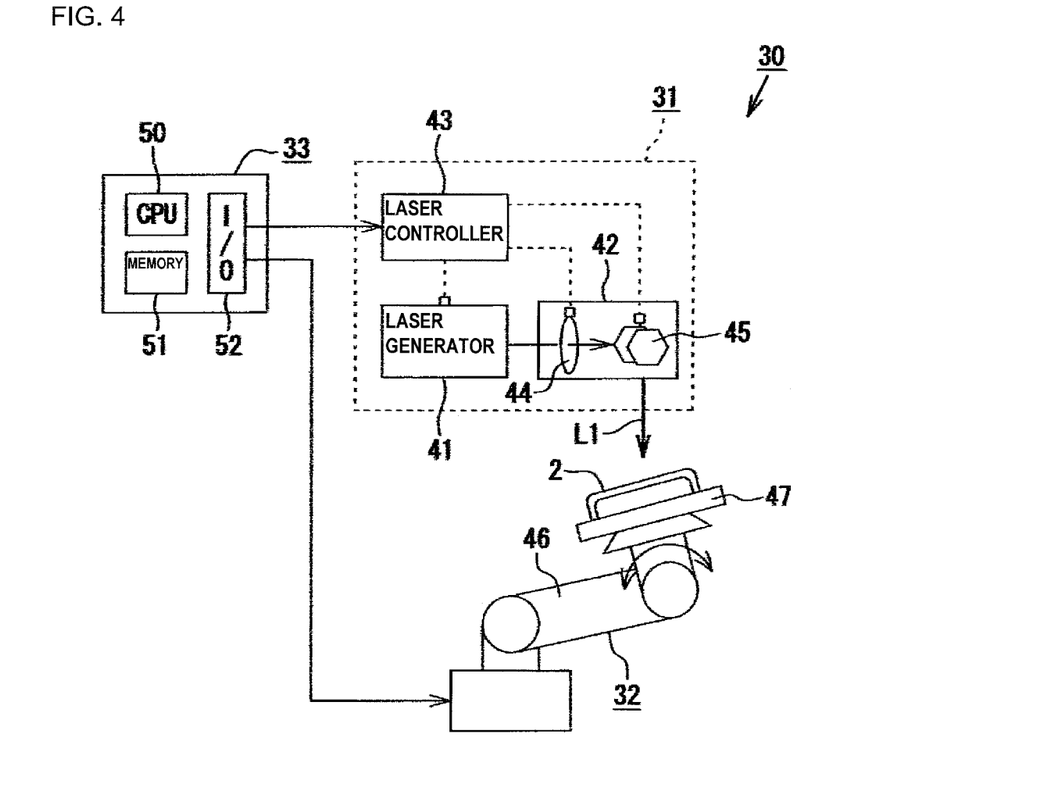
FIG. 4 is a skeleton framework showing the surface-decorating system.

The surface-decorating system 30 for manufacturing the automotive-decorated part 1 is described below.

As shown in FIG. 4, the surface-decorating system 30 comprises a laser-irradiation device 31, a work-displacement robot 32, and a control device 33. The laser-irradiation device 31 comprises a laser generator 41 to generate the laser L1 (YAG laser having the wavelength of 1,064 nm for the embodiment of this invention), a laser deflector 42 to deflect the laser L1, a laser controller 43 to control the laser generator 41, and the laser deflector 42. The laser deflector 42 is an optical device of the combined lens 44 and reflection mirror 45. Changing the position of the lens 44 and reflection mirror 45 makes it possible to adjust the irradiation position of the laser L1 and its focal point. The laser controller 43 controls the laser L1 irradiation-temporal modulation, the irradiation-intensity modulation, and the irradiation-area modulation or the like.

The work-displacement robot 32 comprises a robot arm 46 and a work-supporting part 47 provided on the tip of the robot arm 46. The work-supporting part 47 supports the resin compact 2 on which the coat layer 3 is made. The work-displacement robot 32 activates the robot arm 46 to change the position and angle of the resin compact 2 and to change the irradiation position of the laser L1 relative to the surface of the resin compact 2.

The control device 33 consists of a well-known computer comprising a CPU 50, a memory 51, and an I/O (input-output) port 52 or the like. The CPU 50 is electrically connected to the laser-irradiation device 31 and to the work-displacement robot 32, which are controlled by a separate drive signal.

The memory 51 holds the laser-irradiation data for irradiating the laser. The laser-irradiation data is data that can be obtained by converting the CAD data. The CAD data is data that can be obtained by converting the data of the surface shape of the resin compact 2 and of the image data of the design 4 or the like. Also, the memory 51 is equipped with the data of the laser L1 irradiation parameter (such as the irradiation position, focal point, irradiation angle, irradiation area, irradiation time, irradiation intensity, irradiation frequency, and irradiation pitch or the like).

The method for manufacturing the automotive-decorated part 1 is described below.

Prepare a certain resin compact 2 that is three-dimensionally formed using thermoplastic resin (ABS resin for the embodiment of this invention). The operator sets the resin compact 2 onto the work-supporting part 47 of the work-displacement robot 32 (See FIG. 4).

Figure 5:
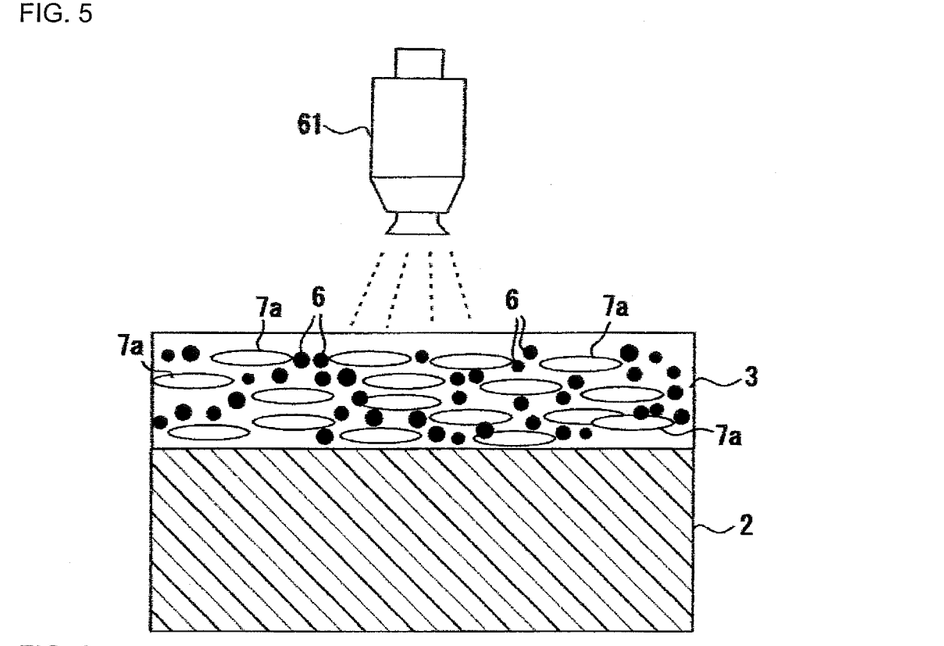
FIG. 5 is an explanatory diagram showing the coat layer-forming process.

Proceed in forming the coat layer 3 for covering the surface of the resin compact 2 by using the metallic-coating material containing the blue-colored pigment 6 and the aluminum flake 7a (See FIG. 5). Specifically, the CPU 50 generates the drive signal in forming the coat layer 3, and that drive signal is emitted to the coating equipment (not shown in the drawing). The coating equipment activates the coating machine 61 to start the coating of the coat layer 3 based on the drive signal being emitted by the CPU 50. In this process, the coating machine 61 forms the film 3 by coating the metallic-coating material onto the surface of the resin compact 2. Immediately after this coating process, whilst the coat layer 3 is hardening, the aluminum flake 7a gradually sinks into the coat layer 3 under its own weight, and each aluminum flake 7a uniformly spreads and aligns parallel to the surface of the coat layer 3. Thus, there is a region at the surface part of the coat layer 3 free of an aluminum flake 7a, and there is no aluminum flake 7a exposed in the coat layer 3. The pigment 6 contained in the coat layer 3 is a blue-colored pigment, and the energy-absorption rate of the laser L1 to the coat layer 3 is 40% or less.

Figure 6:
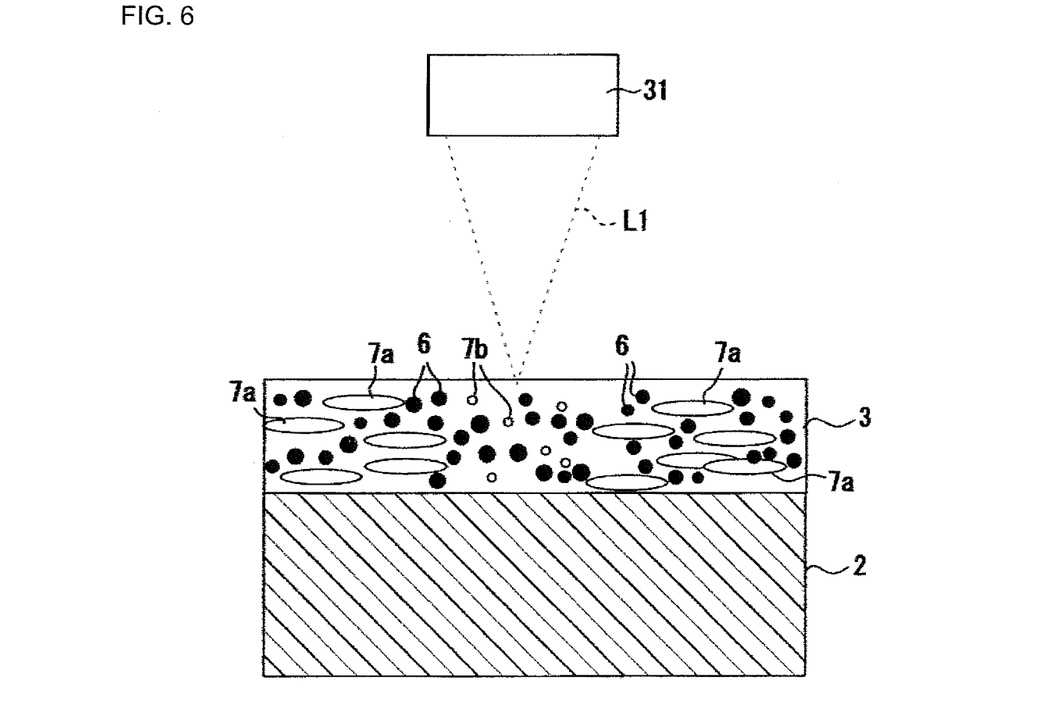
FIG. 6 is an explanatory diagram showing the laser-printing process.

Further, about the laser-printing process, the laser L1 is irradiated onto the coat layer 3 on the surface of the resin compact 2, and such processing heat by the laser L1 thermally deforms the aluminum flake 7a within the coat layer 3. Specifically, the CPU 50 generates the laser-irradiation data for irradiating the laser, with such predetermined data as the irradiation parameter (including the irradiation position, focal point, irradiation area, irradiation time, irradiation intensity or the like) having been stored in the memory 51 in advance.

The laser-irradiation data for example is generated as follows. The operator uses well-known imaging software to make image data for the second region R2 (the laser-irradiation area) that corresponds to the design 4. The CPU 50 converts such image data to CAD data. The CPU 50 then converts the image data previously converted to CAD data into the laser-irradiation data. The CPU 50 stores such converted laser-irradiation data into the memory 51.

About the aforementioned laser-printing process, the CPU 50 conducts the laser irradiation based on the laser-irradiation data stored in the memory 51. Specifically, the CPU 50 reads the laser-irradiation data stored in the memory 51 and generates the drive signal based on such laser-irradiation data. Then, the CPU 50 emits the generated drive signal to the laser-irradiation device 31. The laser-irradiation device 31 then irradiates the laser L1 onto the coat layer 3 formed on the surface of the resin compact 2 based on the drive signal being emitted by the CPU 50 (See FIG. 6). The laser controller 43 of the laser-irradiation device 31 controls the laser deflector 42 according to the pattern of the image data and activates the laser generator 41 to irradiate the laser L1. This controlling action determines the irradiation position of the laser L1, and determines the energy density of the laser L1 irradiating onto the coat layer 3 to be 50 to 900 $MW/cm^2$ (170 $MW/cm^2$ for the embodiment of this invention). As the condition of laser irradiation, it is possible to maintain the same condition of surface structure and color of the surface of the coat layer before and after the laser L1 irradiation.

On the second region R2, the laser L1 irradiated by the laser generator 41 is hardly absorbed by the resin material or the pigment 6 of the coat layer 3 before reaching the aluminum flake 7a. The processing heat generated by the laser L1 and hitting the aluminum flake 7a is efficiently absorbed by the aluminum flake 7a. As the aspect ratio A1 is to be less, the scale-shaped aluminum flake 7a in the coat layer 3 is thermally deformed into a spherical shape and turns into the aluminum powder 7b. At this time, the aluminum powder 7b, now deformed into a spherical shape in the second region R2, becomes nano-sized and thus invisible or hard to recognize.

Figure 7:
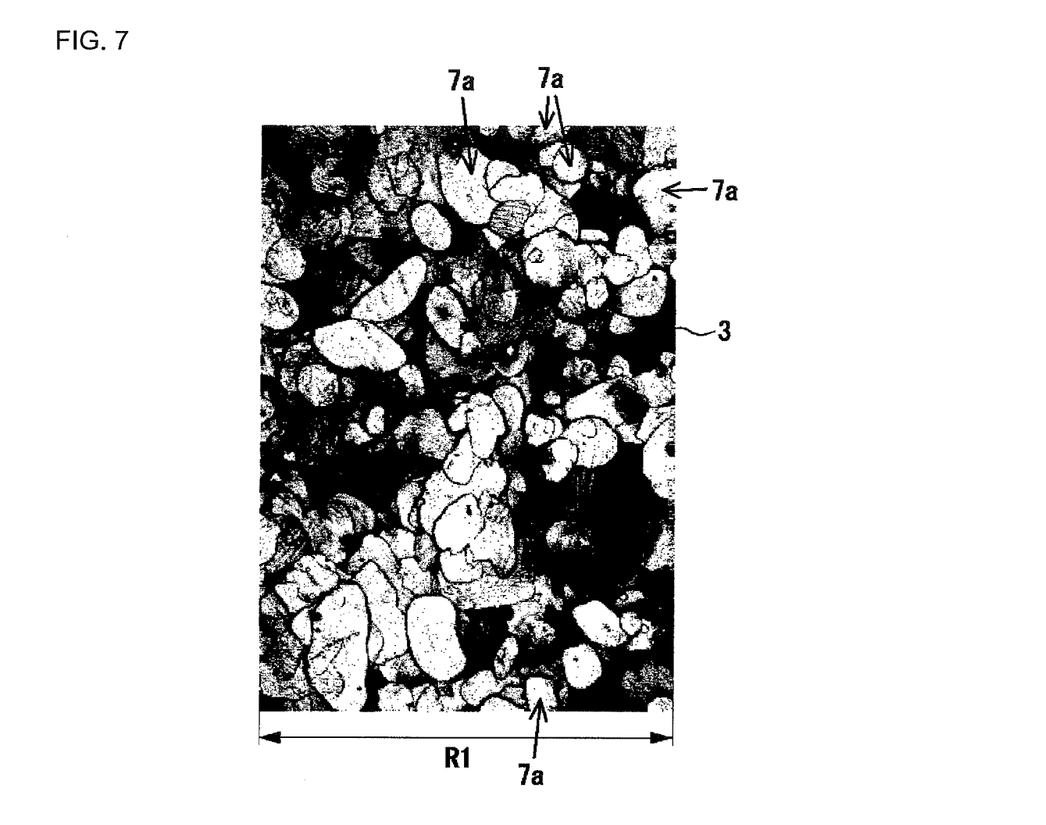
FIG. 7 is an explanatory diagram showing a SEM photograph of a coat layer before the laser is irradiated.
Figure 8:
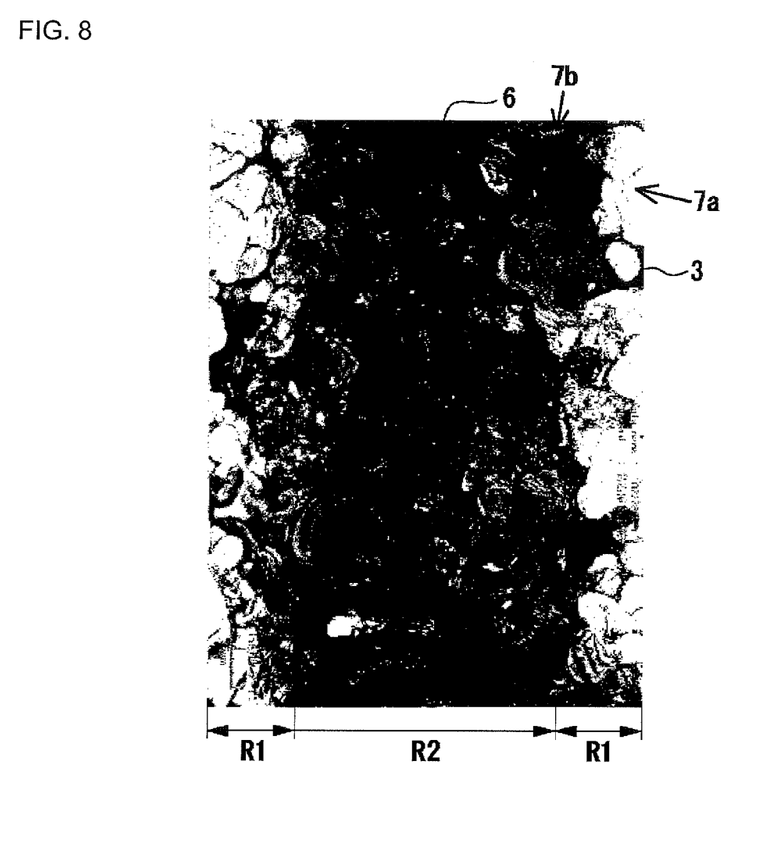
FIG. 8 is an explanatory diagram showing a SEM photograph of a coat layer after the laser has been irradiated.

FIG. 7 shows the coat layer 3 before the laser is irradiated, and FIG. 8 shows the coat layer 3 after the laser has been irradiated. FIGS. 7 and 8 are SEM photographs observed at 2,000-fold magnification. As shown in FIGS. 7 and 8, the aluminum flake 7a is condensed from scale shape to spherical shape. Therefore, the pigment 6 hidden in the aluminum flake 7a is now visible at the surface part of the coat layer, thus improving the visibility of the pigment 6 in the second region R2 (the laser-irradiation area). Also, the aluminum powder 7b of spherical shape becomes fine-sized, so that it cannot be observed in a SEM photograph of even 2,000-fold magnification.

Regarding the coat layer 3 of the second region R2, the resin material around the aluminum flake 7a becomes soft by the heat of the aluminum flake 7a following heat deformation of the aluminum flake 7a. On the other hand, the aluminum 7a does not exist at the surface part of the coat layer 3, and the laser L1 is hardly absorbed. Thus, the surface is neither curved nor burned. Therefore, the aluminum flake 7a and aluminum powder 7b are not exposed on the surface of the coat layer 3, and the flat surface is maintained. The inventor of this invention observed the cross-section of the first region R1 and second region R2 through a microscope at 300-fold magnification, and he saw that the surface was not convex or concave in the border of each region R1 and R2.

The CPU 50, based on the laser-irradiation data stored in the memory 51, irradiates the laser L1 onto the entire second region R2 consisting of the design 4 on the surface of the part. As a result, the design 4 is printed onto the coat layer 3 of the resin compact 2. Thus, the automotive-decorated part 1 is completed as shown in FIGS. 1 and 2.

Therefore, the following effects of the embodiments of this invention are realized.

(1) In the embodiment of this invention, the laser L1 is irradiated onto the second region R2 of the coat layer 3 on the surface of the part, and the scale-shaped aluminum flake 7a is thermally deformed into a spherical shape to lessen the aspect ratio and thus reduce the surface area of the coat layer 3. On the other hand, the laser L1 is not irradiated onto the first region R1 of the coat layer 3, and the aluminum flake 7a of a greater aspect ratio A1 remains, thus making it possible to differentiate optical transmittance and optical reflectivity in the first region R1 (non-laser irradiation area) and the second region R2 (laser-irradiation area). Such a difference makes it possible to print the design 4. Also, in the laser-printing process, the laser-irradiation condition is set so as to maintain the same surface of the coat layer 3 before and after the laser L1 irradiation. Therefore, the surface condition of the first region R1 of the coat layer 3 is the same as that of the second region R2 of the coat layer 3. As such, the decorative method of the embodiment of this invention allows for printing the design 4 without curving the coat layer 3 into a hollow shape, as is conventionally done, thus making it possible to avoid the problem of the aluminum flake 7a and aluminum powder 7b being exposed on the surface of the coat layer 3. Therefore, it is possible to maintain the coat layer performance (the performance of chemical resistance or of oil-staining resistance or the like), thus securing sufficient product liability of the decorated part 1.

(2) In the embodiment of this invention, the coat layer 3 contains the blue-colored pigment 6. Once the scale-shaped aluminum flake 7a is thermally deformed into the spherical-shaped aluminum flake 7a, thereby lessening the aspect ratio A1 and thus reducing the surface area, the blue color of such a pigment 6 is accentuated, making it possible to print a clear design onto the coat layer, thus sufficiently improving the design quality of the parts.

(3) In the automotive decorated part 1 of the embodiment of this invention, the coat layer 3 contains the aluminum flake 7a of a ratio of 0.5 to 5.0% by weight. If the aluminum flake 7a is contained in the coat layer 3 in a ratio less than 0.5% by weight, it is impossible to obtain sufficiently the thermal deformation of the aluminum flake 7a. If the aluminum flake 7a of the coat layer 3 exceeds 5.0% by weight, the aluminum flake 7a is greatly affected so that the coloring effect by the pigment is insufficiently obtained. Therefore, as shown in the embodiment of this invention, the micronized-metallic powder of the aluminum flake 7a of the ratio of 0.5 to 5.0% by weight makes it possible to print the design 4 onto the coat layer 3 of the surface of a part.

(4) In the automotive-decorated part 1 of the embodiment of this invention, the coat layer 3 is formed by using a non-leafing type of metallic-coating material of which the aluminum flake 7a does not appear at the surface part of the coat layer. The laser-absorption rate of the coat layer 3 is 40 percent or less. As such, the aluminum flake 7a does not exist at the surface part of the coat layer 3, and the energy of the laser L1 is hardly absorbed on the surface, thus surely preventing convex and concave parts from forming at the surface part of the coat layer 3. Also, the aluminum flake 7a is uniformly spread and aligned parallel to the surface of the coat layer 3. Thus, the laser L1 irradiating from the surface part of the coat layer 3 surely hits the aluminum flake 7a. Such a processing-heat can then thermally deform the aluminum flake 7a from scale shape to spherical shape.

The embodiment of this invention can be modified as follows.

In the above embodiment of this invention, the coat layer 3 contains the blue-colored pigment 6. However, another color pigment other than black can be contained in the coat layer 3. Also, instead of the pigment 6, a dye compound can be contained in the coat layer 3. Moreover, the coat layer 3 can be transparent, without the pigment 6 or a dye compound. Even if the aluminum flake 7a is contained in the first region R1 in the transparent-coat layer 3, and the spherical-shaped aluminum powder 7b is contained in the second region R2, such a difference in optical reflectivity and optical transmittance between the region R1 and region R2 makes it possible to print the design 4. Also, the aluminum flake 7a is a micronized-metallic powder containing a colored pigment on its surface. Alternatively, a colored-metallic pigment can be used.

In the above embodiment of this invention, the resin compact 2 consists of the automotive decorated part 1 formed by using the ABS resin. However, another resin material can be used. Also, the resin compact 2 can be of another colored compact with a certain color (other than flesh-color) of this embodiment or of a water-clear color or of a transparent resin compact 2. If the automotive-decorated part 1 is manufactured using a water-clear color or a transparent resin compact 2, a lighting device such as a back light provided on the lower side of the automotive-decorated part 1 makes it possible to recognize the design 4 of the coat layer 3 through the transmitted light, thus making it possible to realize an automotive-decorated part 1 of excellent design effect.

In the automotive decorated part 1 of the above embodiment of this invention, the coat layer 3 is formed on the surface of the resin compact 2. However, a clear-coating layer to protect the coat layer 3 can also be formed on the surface. Hence, if a water-clear coating material that efficiently transmits the laser L1 is used to form the clear-coating layer, the laser-printing process can be conducted after the forming process of the clear-coating layer to print the design 4 eventually onto the coat layer 3.

In the above embodiment, the YAG laser having the wavelength of 1,064 nm is used for the laser-printing process, but it is not limited to that. According to the type of coat layer 3 or micronized-metallic powder 7, a laser except a YAG laser can be used for the laser-printing process.

In the above embodiment, the automotive-decorated part 1 is embodied on the armrest of an automobile door. However, it can be embodied on the console box, the instrument panel or another part or component. Moreover, besides automotive parts, the above embodiment can be used in the making of decorated parts for aircraft, marine vessels or the like. Furthermore, it can be used in the making of decorated parts such as decorative panels or the like for home electric appliances.

Besides the technical ideas of this invention as described above, other technical ideas to be understood are described hereinafter.

(1) A decorative method for a given part according to the means 1 and 2, characterized in that as the laser-irradiation condition, the laser wavelength is 1,064 nm, and the laser-energy density is 50 to 900 MW/cm².

(2) A decorative method for a given part according to the means 1 and 2, characterized in that the coat layer contains a color-dye compound except a black-dye compound.

(3) A decorative method for a given part according to the means 1 and 2, characterized in that a pigment is contained in the coat layer in the ratio of 1.0 to 8.5% by weight.

(4) A decorative method for a given part according to the means 1 and 2, characterized in that the average value of the maximum dimension of the first scale-shaped micronized-metallic powder is 5 to 50 μm, and the average value of the minimum dimension is 0.05 to 2 μm.

(5) A decorative method for a given part according to the means 1 and 2, characterized in that the first scale-shaped micronized metallic powder has the aspect ratio of 20 or more, and that in the laser-printing process the first micronized-metallic powder is thermally deformed so that the aspect ratio becomes less than 5.

(6) A decorative method for a given part according to the means 1 and 2, characterized in that the first scale-shaped micronized-metallic powder is a micronized powder of which the colored pigment is absorbed therein and functions as a colored metallic-powder pigment.

(7) A decorative method for a given part according to the means 1 and 2, characterized in that the coat layer is formed using a non-leafing type of coating material that does not appear at the surface part of the first scale-shaped micronized metallic powder.

(8) A decorative method for a given part according to the means 1 and 2, characterized in that the convex and concave parts corresponding to the design are not formed on the surface of the coat layer.

(9) A decorative method for a given part according to the means 1 and 2, characterized in that the laser-absorption rate to the coat layer is 40% or less.

(10) A decorative method for a given part according to the means 1 and 2, characterized in that on the coat layer in the coat layer-forming process, the first scale-shaped micronized-metallic powder is uniformly spread and aligned parallel to the surface of the coat layer.

DESCRIPTION OF THE REFERENCE SIGNS

1: Automotive-decorated part as a decorated part
3: Coat layer
4: Designs
6: Pigment
7a: Aluminum flakes as the micronized-metallic powder and as the first micronized-metallic powder
7b: Aluminum powder as the micronized-metallic powder and as the second micronized-metallic powder
L1: Laser
R1: First region
R2: Second region

The invention claimed is:

1. A decorated part of which a coat layer is formed on the part surface, and designs are printed on the coat layer, the coat layer comprising:
a first region mainly of the first scale-shaped micronized-metallic powder of an aspect ratio that is the average value of the ratio of the maximum dimension of the micronized-metallic powder to the average value of the minimum dimension of the micronized-metallic powder, and
a second region mainly of a second spherical-shaped micronized-metallic powder that is of an aspect ratio less than that of the first value, the second region laterally adjacent to the first region and having a surface structure and color the same as a surface structure and color of the first region, wherein the coat layer designs are printed according to an alignment and shape of the first and second regions, and
further wherein convex and concave parts corresponding to the designs are not formed on the surface of the coat layer.

2. A decorated part according to claim 1, characterized in that the coat layer contains a colored pigment except black.

3. A decorated part according to claim 2, characterized in that the pigment is of the ratio of 1.0 to 8.5% by weight of the coat layer.

4. A decorated part according to claim 1, characterized in that the coat layer contains a colored-dye compound except black.

5. A decorated part according to claim 1, characterized in that the average value of the maximum dimension of the first micronized-metallic powder of scale shape is 5 to 50 μm, and the average value of the minimum dimension is 0.05 to 2 μm.

6. A decorated part according to claim 1, characterized in that the first micronized-metallic powder of scale shape is a micronized powder in which a colored pigment is absorbed therein and functions as a colored metallic-powder pigment.

7. A decorated part according to claim 1, characterized in that a coat layer is formed using a non-leafing type of metallic-coating material of which the first micronized-metallic powder of scale shape does not appear at the surface part of the coat layer.

8. A decorated part according to claim 1, characterized in that the laser-absorption rate of the coat layer is 40 percent or less.

* * * * *